United States Patent [19]

Ida et al.

[11] Patent Number: 4,604,662
[45] Date of Patent: Aug. 5, 1986

[54] AUTOMATIC MODE-CHANGE MECHANISM FOR TAPE RECORDER

[75] Inventors: Mitsuru Ida, Saitama; Minoru Shimada, Chiba, both of Japan

[73] Assignee: Sony Corporation, Tokyo, Japan

[21] Appl. No.: 632,623

[22] Filed: Jul. 19, 1984

[30] Foreign Application Priority Data

Jul. 30, 1983 [JP] Japan .................. 58-140266

[51] Int. Cl.⁴ .................. G11B 15/18; G11B 15/28
[52] U.S. Cl. .................. 360/74.1; 360/74.2
[58] Field of Search .......... 360/69, 71, 74.1–74.3, 360/130.1, 130.2, 130.3, 130.31, 130.32; 242/186–191

[56] References Cited

U.S. PATENT DOCUMENTS

| | | | |
|---|---|---|---|
| 3,779,498 | 12/1973 | Takashino | 360/74.2 |
| 4,190,215 | 2/1980 | Hochbaum et al. | 242/191 |
| 4,222,536 | 9/1980 | Kobayashi | 242/191 |
| 4,227,223 | 10/1980 | Magata et al. | 360/74.1 |
| 4,269,373 | 5/1981 | Tsuchiya et al. | 242/191 |
| 4,495,532 | 1/1985 | Kurafuzi et al. | 360/74.1 |
| 4,500,049 | 2/1985 | Sugihara | 242/186 |

FOREIGN PATENT DOCUMENTS

56-140537 11/1981 Japan .................. 242/188

*Primary Examiner*—Raymond F. Cardillo
*Assistant Examiner*—Steven R. Garland
*Attorney, Agent, or Firm*—Lewis H. Eslinger; Alvin Sinderbrand

[57] ABSTRACT

A mechanism for use in a cassette tape recorder automatically changes the mode of the recorder when the end of the tape is reached by sensing the cessation of rotation of the pinch roller. A mode change lever having an elongated hole with converging sides that receives a cylindrical portion of the pinch roller is biased by a spring so that the cylindrical portion engages the converging sides and the mode-change lever tends to rotate in a first direction. Once the pinch roller ceases to rotate, the mode-change lever is moved in a direction opposite the first direction and so that it cooperates with a mode-change drive assembly rotated by the capstan. The mode-change lever is then displaced and releases a mode key, so that the mode of the recorder is changed and is typically shut off.

9 Claims, 13 Drawing Figures

AUTOMATIC MODE-CHANGE MECHANISM FOR TAPE RECORDER

BACKGROUND OF THE INVENTION

1. Field of the Invention

This invention relates generally to cassette tape recording and/or reproducing apparatus, and more particularly is directed to the provision of such apparatus with an improved automatic shut-off or other mode changing device.

2. Description of the Prior Art

Various mechanical arrangements have been proposed for automatically halting the driving of the tape and reels within a cassette upon the full unwinding of the tape from a supply reel to a take-up reel. One such device, for example, as disclosed in detail in U.S. Pat. No. 3,779,498, having a common assignee herewith, employs a rotary member which always rotates when the tape is running, for example, as in the normal forward mode, but stops when the tape is fully unwound from the supply reel onto the take-up reel, an elongated shut-off lever or plate which is mounted for rotation about the axis of the rotary member and a frictional clutch for urging the shut-off lever to turn with the rotary member so long as the latter is being rotated. A cam is driven from the motor which rotates the capstan and causes a repeated uniform stroke or reciprocating movement of a pawl member so long as the motor is operated. The pawl member is engageable with teeth on a reciprocating slide which is made to undergo a movement sufficient to change-over from the normal forward mode to the stop mode of the apparatus only when the motor continues to operate while the rotary member is halted with the result that the frictional clutch no longer angularly urges the shut-off lever to turn.

The above generally described shut-off device is disadvantageously complicated. For example, such device requires the installation of a frictional ring between the shut-off lever and the associated rotary member, a helical compression spring extending along the axis of the rotary member to urge the shut-off lever and rotary member toward each other with the frictional ring therebetween, and an annular spring seat extending around the axis of the rotary member for retaining the helical spring thereon. Further, this prior shut-off device is disadvantageous in that the frictional ring, helical spring and spring seat or annulus arranged along the axis of the rotary member undesirably increase the dimensions of the device in that direction, and therefore discourage the provision of such a device in portable cassette tape recording and/or reproducing apparatus where miniaturization is generally desirable. Moreover, by reason of the relatively complex construction of the described existing shut-off device, assembling thereof is relatively difficult and increases the cost thereof.

OBJECTS AND SUMMARY OF THE INVENTION

Accordingly, it is an object of this invention to overcome the foregoing disadvantages of the previously proposed automatic shut-off device for cassette tape recording and/or reproducing apparatus.

More specifically, it is an object of the invention to provide a relatively simple and compact automatic shut-off device for cassette tape recording and/or reproducing apparatus.

Another object is to provide an improved automatic shut-off device, as aforesaid, which is suitable for employment in a portable cassette tape recording and/or reproducing apparatus having a relatively thin casing or housing.

Still another object is to provide an improved automatic shut-off device, as aforesaid, which can be assembled and repaired without difficulty.

In accordance with an aspect of this invention, in a cassette type recording and/or reproducing apparatus having a capstan or tape driving member which, in a selected operating mode of the apparatus, such as, the normal forward mode, is rotated for driving the tape in the cassette in the direction for winding the tape onto a take-up reel, a device for automatically changing the operating mode of the apparatus when the tape is fully wound on the take-up reel comprises a rotary member, such as, a pinch roller, which is rotated when the tape is running and which stops rotating when the tape is fully wound on the take-up reel, a mode-change lever having an elongated hole with converging sides in which a cylindrical actuating portion of the pinch roller is received so that the mode-change lever is angularly displaceable about the axis of rotation of the pinch roller and also longitudinally displaceable in the direction along the elongated hole, spring means urging the mode-change lever in one direction along its elongated hole for frictionally engaging the converging sides of the hole with the actuating portion and thereby frictionally urging the mode-change lever to turn with the pinch roller so long as the latter is rotated, means for establishing another operating mode of the apparatus, for example, the stop mode, in response to displacement of the mode-change lever in the opposite direction along its elongated hole against the force of the spring means, and mode-change drive means effecting a repeated motion in response to rotation of the capstan and being operative to displace the mode-change lever in the direction against the force of the spring means only when the pinch roller stops rotating and thereby no longer frictionally urges the mode-change lever to turn therewith about the axis of the pinch roller.

The above, and other objects, features and advantages of this invention, will be apparent in the following detailed description of an illustrative embodiment thereof which is to be read in connection with the accompanying drawings wherein the same reference numerals identify corresponding parts in the several views.

DETAILED DESCRIPTION OF A PREFERRED EMBODIMENT

Referring to the drawings in detail, and initially to FIGS. 1-4 thereof, it will be seen that an automatic shut-off device according to an embodiment of this invention may be incorporated in a portable cassette tape recording and/or reproducing apparatus of the type having a pinch roller 1 rotatably mounted on a support arm 2 by means of an axle 3. The support arm 2 is shown to be pivotally mounted on a post 4 extending from a head base plate 5. Support arm 2 is acted on by a torsion spring 6 so as to be angularly urged about post 4 in the direction of the arrow a on FIG. 2.

Figure 2:
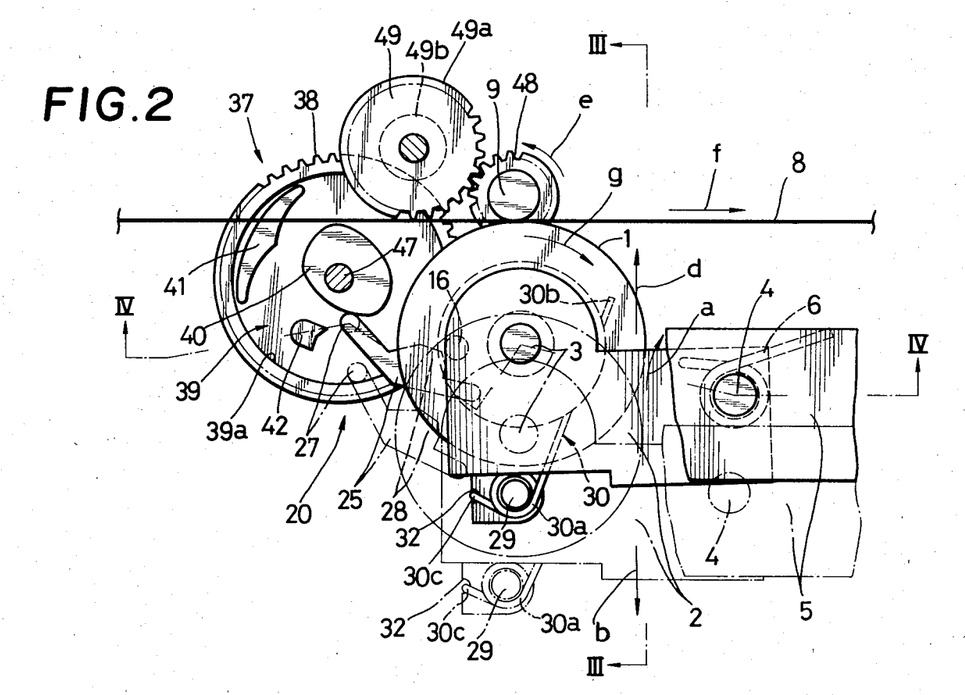
FIG. 2 is a top plan view of the automatic shut-off device of FIG. 1.
Figure 3:
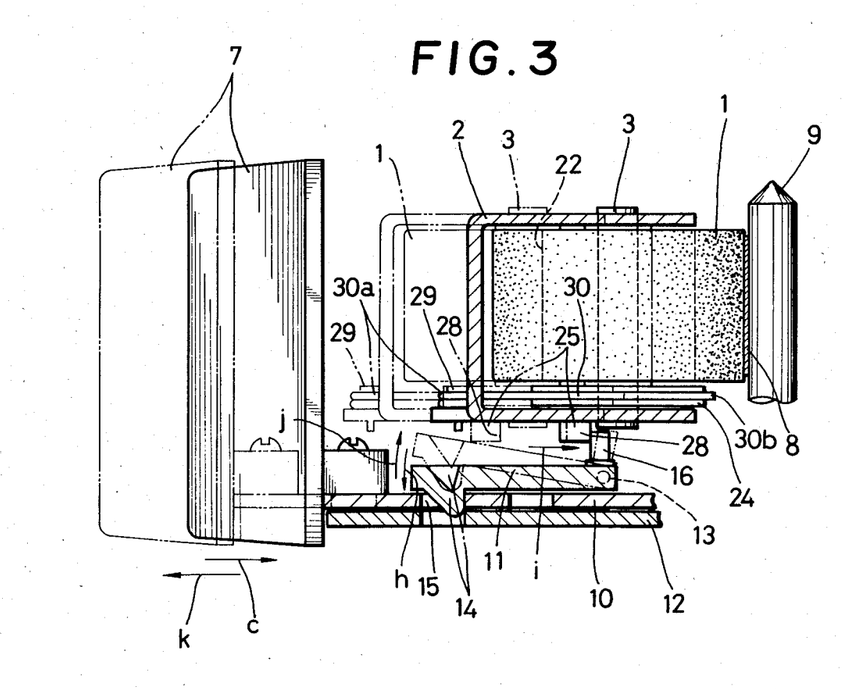
FIG. 3 is a sectional view taken along the line III—III on FIG. 2, and showing the shut-off device according to this invention associated with a push-button for establishing a normal forward mode of a cassette tape and/or reproducing apparatus and with a latch device for maintaining such push-button in its active position.

In a stop mode of the recording and/or reproducing apparatus, a push-button 7 is in its inactive or extended position shown in dot-dash lines on FIG. 3 and, as a result thereof, head base plate 5 is moved backward in the direction of the arrow b on FIG. 2 by a return spring (not shown). Further, in the stop mode, pinch roller 1 is moved with head base plate 5 to its inoperative position shown in dot-dash lines on FIGS. 2 and 3, and in which pinch roller 1 is withdrawn from a type cassette (not shown) installed in the apparatus. When push-button 7 is manually depressed in the direction of the arrow c on FIG. 3 to its active position shown in full lines for establishing a normal forward mode of the apparatus, for example, for a recording or reproducing operation thereof, head base plate 5 and pinch roller 1 on support arm 2 are correspondingly moved in the direction of the arrow d on FIG. 2. As a result of the foregoing, pinch roller 1 is inserted into the operatively positioned tape cassette (not shown) and urges a magnetic tape 8 in the cassette against a capstan 9 with a constant pressure determined by torsion spring 6. In the normal forward mode, capstan 9 is rotated by the usual motor (not shown) in the direction of the arrow e on FIG. 2 with the result that tape 8 is driven at a constant speed in the direction of the arrow f and pinch roller 1 is rotated in the direction of the arrow g in response to the movement of the tape.

In order to maintain the apparatus in its normal forward mode, push-button 7 is shown to be mounted on a slide 10 (FIG. 3) which is longitudinally movable on a chassis 12 under a latch plate 11 which is pivotally mounted at 13 on chassis 12. Latch plate 11 is shown to be formed with a downwardly struck latch nose 14 engageable, when push-button is depressed to its active position, in a keeper or slot formed in slide 10. Thus, after push-button 7 has been depressed to its active position shown in full lines on FIG. 3 for establishing the normal forward mode of the associated recording and/or reproducing apparatus, latch plate 11 is urged downwardly in the direction of the arrow h, for example, by a suitable spring (not shown), to engage nose 14 in keeper 15 and thereby lock push-button 7 in its active position for maintaining the normal forward mode of operation.

A pin or abutment 16 extends upwardly from latch plate 11 near the pivoting axis of the latter and a shut-off device 20 embodying the present invention is operative, when the magnetic tape 8 is fully unwound from the supply reel onto the take-up reel with the apparatus in its normal forward mode, for example, during a recording or reproducing operation, to act in the direction of the arrow i on FIG. 3 against abutment 16 for upwardly tilting latch plate 11 in the direction of the arrow j. When latch plate 11 is thus upwardly tilted, nose 14 is removed from keeper 15 with the result that slide 10 and push-button 7 are free to be returned in the direction of the arrow k to the inactive position shown in dot-dash lines on FIG. 3, for example, by a suitable spring (not shown) associated therewith. Such return movement of slide 10 and push-button 7 to the inactive position is effective to restore head base plate 5 in the direction of the arrow b on FIG. 2 to the inoperative position shown in dot-dash lines with the result that pinch roller 1 is separated from capstan 9 for automatically establishing the stop mode of the apparatus.

The automatic shut-off device 20 embodying this invention is shown to generally comprise a mode-change lever 21 which is mounted for both angular displacements about, and longitudinal displacements relative to the axis P of pinch roller 1. More particularly, pinch roller 1 is desirably in the form of a rubber sleeve fixed on a rigid core or hub 22 of synthetic resin which is rotatable on the axle 3. At the lower end of hub 22, the latter is formed with a reduced diameter extension forming an actuating portion 23 having a cylindrical outer surface 23a. As shown particularly on FIGS. 5 and 6, mode-change lever 21, which is also preferably molded of a suitably rigid synthetic resin, includes a disk-shaped portion 24 at one end having an arm portion 25 extending laterally from its underside. Disk-shaped portion 24 of lever 21 has an elongated slot 26 extending therethrough and formed with side walls which converge in the direction generally away from that in which arm portion 25 extends from disk-shaped portion 24. The minimum distance $W_1$ and the maximum distance $W_2$ between the converging side walls of slot 26 are determined according to the following relationships:

$$W_1 < D_1 \text{ and } W_2 > D_1$$

($D_1$ being the diameter of the cylindrical outer surface 23a of actuating portion 23). Further, slot 26 has a semicircular wall portion 26a at the end of the slot corresponding to the maximum distance between its converging side walls. At the free end of arm portion 25 of lever 21 there is a depending pin or cam following portion 27. Further, arm portion 25, at the region thereof adjacent disk-shaped portion 24, defines a step 28 located below disk-shaped portion 24 and being normally spaced from upstanding pin 16 on latch plate 11. However, step 28 is adapted to act against pin 16 in a shut-off operation of device 20, as hereinafter described in detail.

Figure 6:
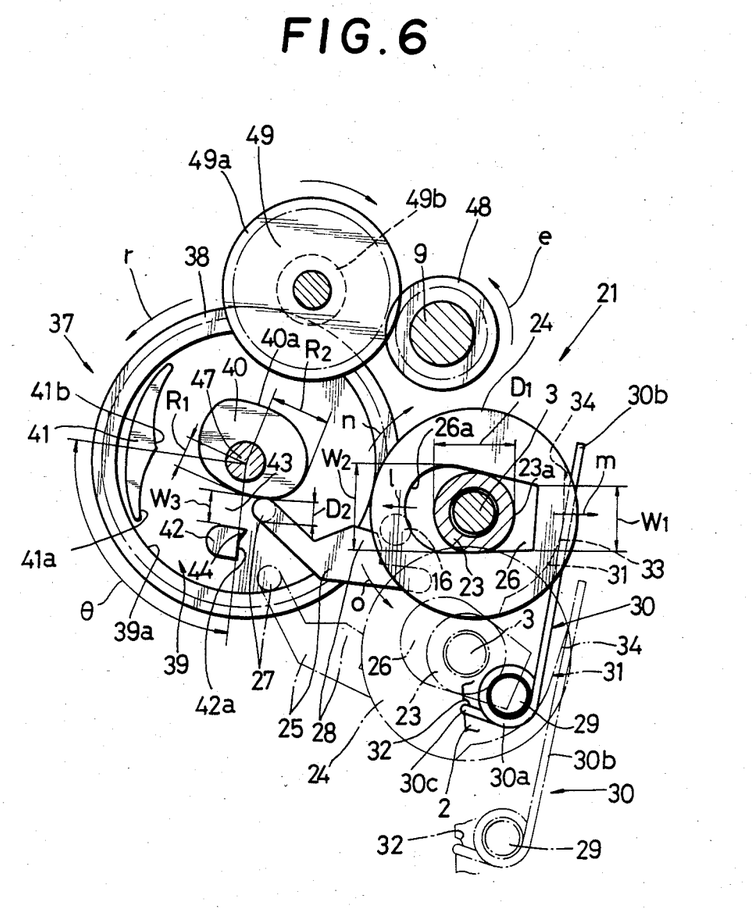
FIG. 6 is a plan view of the structure appearing on FIG. 5.

It will be appreciated that, by reason of the reception of the portion 23 of the pinch roller hub in elongated slot 26 of mode-change lever 21, the latter is longitudinally displaceable in the directions of the arrows l and m on FIG. 6, that is, in directions along the elongated hole 26, in a plane perpendicular to the axis P of rotation of the pinch roller, and is also angularly displaceable about such axis in the directions indicated by the arrows n and o on FIG. 6.

The shut-off device 20 according to this invention is further shown to comprise a torsion spring 30 having a coil portion 30a mounted on a post 29 extending from pinch roller support arm 2. As shown particularly on FIG. 5, spring 30 further has an elongated straight arm 30b extending from one end of coil portion 30a and being engaged in a groove 31 of substantially U-shaped cross-section formed in the peripheral surface of disk-shaped portion 24 of lever 21. The other end portion 30c of spring 30 is bent or hooked, as shown particularly on FIG. 5, and engages in a recess 32 formed in an edge of support arm 2. As shown particularly on FIG. 6, groove 31 includes an arcuate portion 33 which is substantially concentric with the center of disk-shaped portion 24 of lever 21, and a straight end portion 34. It will be appreciated that, when spring arm 30b acts against the bottom of groove 31 at the arcuate portion 33 thereof, spring arm 30b is tangential to the engaged arcuate portion 33 of the groove and thus exerts a force on lever 21 along a line extending through the axis P of the pinch roller with the result that spring arm 30b urges mode-change lever 21 in the direction l along the elongated hole 26, that is, in the direction for frictionally engaging the converging sides of hole 26 with the portion 23 of pinch roller 1 so as to frictionally urge mode-change lever 21 to turn with pinch roller 1 in the direction of the arrow n on FIG. 6 so long as the pinch roller is rotated. However, when mode-change lever 21 is turned about portion 23 of the pinch roller to the position shown in dot-dash lines on FIG. 6, as hereinafter described in detail, straight end portion 34 of groove 31 is engaged, at an angle, by spring arm 30b so that the latter acts on mode-change lever 21 along a line of force offset from the axis P of the pinch roller with the result that spring arm 30b then also urges lever 21 angularly about the axis P in the counterclockwise direction, as viewed on FIG. 6.

Figure 1:
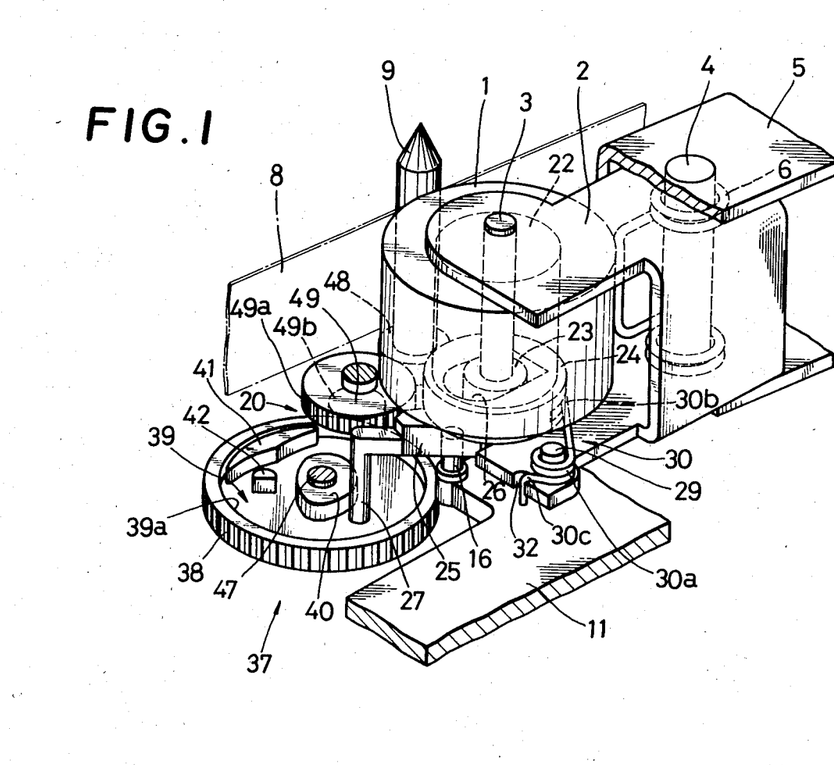
FIG. 1 is a perspective view of an automatic shut-off device in accordance with an embodiment of this invention.
Figure 5:
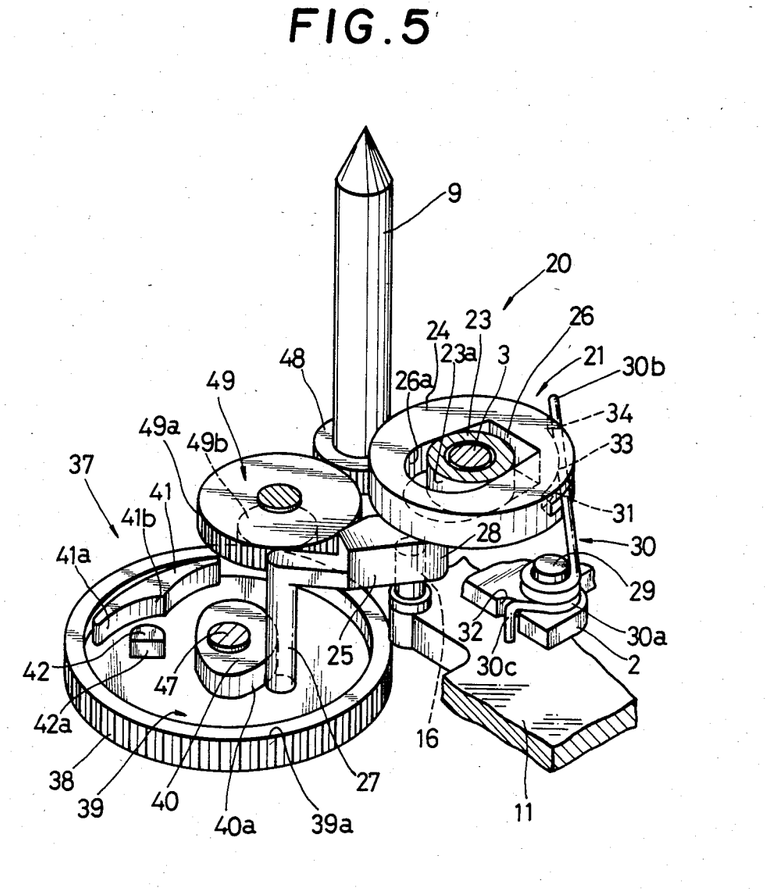
FIG. 5 is an enlarged perspective view similar to that of FIG. 1, but with a pinch roller and its supporting arm removed for better illustrating the structure embodying this invention.

The shut-off device 20 according to this invention is further shown, particularly on FIGS. 1 and 5, to comprise a mode-change drive means 37 which includes a relatively large-diameter gear 38 desirably molded of a synthetic resin, and which is formed with a substantially circular recess 39 in its upper surface. Such recess 39 has molded therein, as integral parts of gear 38, an inner cam member 40 and an outer cam member 41 providing respective cam surfaces 40a and 41a which are alternatively engageable by cam following pin 27 depending from lever 21. A drive projection 42 is also formed in recess 39 at a radial distance from the center of gear 38 intermediate the distances from that center to the surfaces of cams 40 and 41 so as to be engageable with pin 27, as hereinafter described in detail. More particularly, cam 40 is shown on FIG. 6 to be a radial cam having an eccentric peripheral cam surface 40a which varies between a minimum radius $R_1$ and a maximum radius $R_2$ from the axis of a shaft 47 on which gear 38 is rotatable. On the other hand, the outer cam 41 is disposed adjacent the peripheral wall surface 39a of recess 39 and defines a cam surface 41a facing inwardly and leading to a central cusp 41b directed toward shaft 47. As shown particularly on FIG. 6, the portion of the inner cam surface 40a of maximum radius $R_2$ for deflecting cam following pin 27 radially outward from shaft 47, and the cusp 41b of outer cam surface 41a for deflecting pin 27 radially inward toward shaft 47 are angularly displaced, in opposite directions, from drive projection 42 with the angle $\theta$ between drive projection 42 and cusp 41b being desirably about 90°. Further, each of cam surface 40a and 41a is operative, when engaged with cam following pin 27, to deflect the latter to a position in the path of drive projection 42.

More particularly, drive projection 42 is shown to be angularly disposed near a portion of inner cam surface 40a which has the minimum radius $R_1$ with a gap or path 43 being defined therebetween having a width $W_3$ greater than the diameter $D_2$ of cam following pin 27. Further, the operative surface 42a of drive projection 42, that is, the surface facing in the direction of rotation of gear 38 indicated by the arrow r on FIG. 6, has its inner edge at a distance from the axis of shaft 47 equal to the radius $R_2$ and its outer edge at a distance from the axis of shaft 47 equal to the radial distance from the cusp 41b of outer cam surface 41a to the axis of shaft 47. The operative surface 42a of drive projection 42 is, for the most part, in a plane extending radially in respect to the axis of shaft 47 but has a radially inward end portion 44 which is inclined from such radial plane in the direction r in which gear 38 is rotated.

Figure 4:
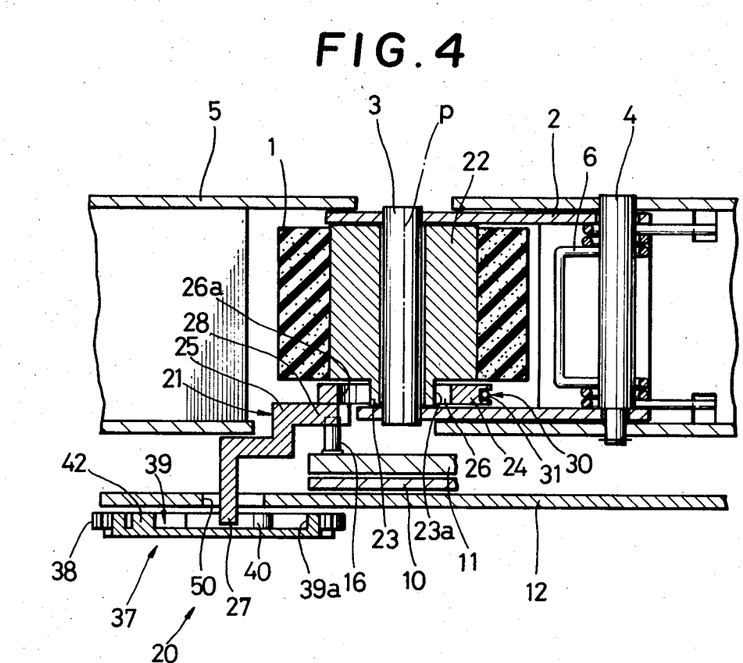
FIG. 4 is a sectional view taken along the line IV—IV on FIG. 2.

As shown particularly on FIG. 4, gear 38 is rotatably mounted on shaft 47 beneath chassis 12 which has an opening 50 through which the lower end portion of cam-following pin 27 extends downwardly into recess 39. As shown on FIGS. 1 and 5, a drive gear 48 fixed relative to capstan 9 for rotation therewith is disposed below chassis 12 for driving gear 38 by means of an intermediate gear member 49 having a relatively large gear 49a meshing with drive gear 48 and an integral small diameter gear 49b meshing with gear 38. Therefore, when capstan 9 is rotated in the direction of the arrow e on FIG. 6 by operation of the associated drive motor, gear 38 is continuously rotated at a constant relatively low speed in the direction of the arrow r.

The above described shut-off device 20 according to an embodiment of this invention operates as follows:

When push-button 7 is depressed in the direction of the arrow c on FIG. 3 to the active position shown in full lines for establishing the normal forward mode of the apparatus, for example, for a recording or reproducing operation, nose 14 on latch plate 11 engages in keeper 15 of slide 10 for locking push-button 7 in its active position, and head base plate 5 is moved with slide 10 in the direction of the arrow d on FIG. 2 so as to similarly move support arm 2 to the position shown in full lines in which pinch roller 1 is in its operative position. In such operative position, pinch roller 1 extends into a tape cassette and presses magnetic tape 8 therein against rotated capstan 9 with a constant pressure determined by spring 6 acting on arm 2. Consequently, in the normal forward mode, magnetic tape 8 is driven at a constant speed in the direction of the arrow f on FIG. 2 in response to the rotation of capstan 9, and such movement of the tape rotates pinch roller 1 in the direction of the arrow g.

Figure 7A:
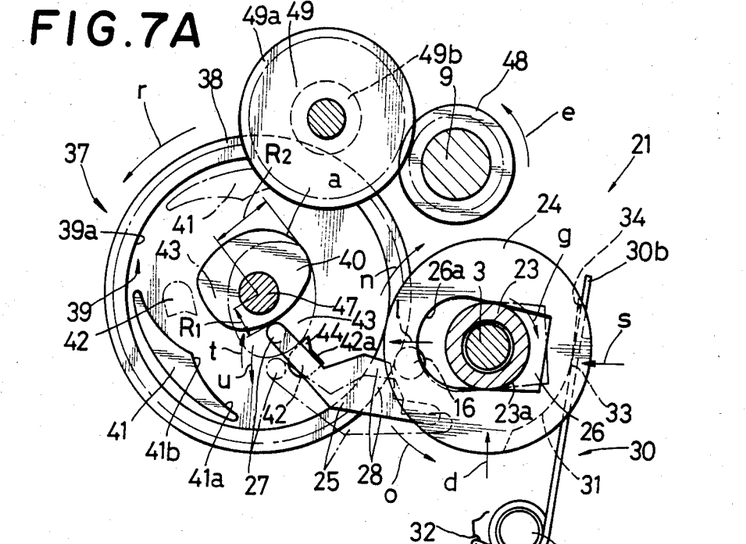
FIGS. 7A-7E are plan views similar to that of FIG. 6, but illustrating various phases in the operation of the automatic shut-off device according to this invention.

The movement of pinch roller 1 to its operative position in the normal forward mode of the apparatus similarly moves shut-off lever 21 in the direction of the arrow d on FIG. 2 so as to dispose lever 21 in its operative position shown on FIG. 7A. In such operative position of shut-off lever 21, spring arm 30b acts on the arcuate portion 33 of groove 31 along a line of force indicated by the arrow s, with the result that shut-off lever 21 is urged longitudinally in the direction of the arrow l for engaging the converging sides of elongated slot 26 with the cylindrical peripheral surface 23a of portion 23 of the pinch-roller hub. So long as magnetic tape 8 is advanced or moved in the direction of the arrow f on FIG. 2 in response to the rotation of capstan 9, the corresponding rotation of pinch roller 1 in the direction of the arrow g on FIGS. 2 and 7A causes corresponding rotation of portion 23 of the pinch-roller hub. By reason of the frictional engagement of the converging sides of slot 26 with the peripheral surface 23a of hub portion 23, shut-off lever 21 is urged to turn in the direction of the arrow n on FIG. 7A about the axis of the pinch roller, with the result that cam-following pin 27 is urged in the direction of the arrow t against inner cam surface 40a. Further, gear 38 is rotated in the direction of the arrow r in response to the rotation of capstan 9 and, due to the eccentric configuration of inner cam surface 40a, during each revolution of gear 38, cam following pin 27 of shut-off lever 21 is oscillated between the positions shown in full lines and in dot-dash lines, respectively. So long as pinch roller 1 continues to rotate with the apparatus in its normal forward mode, the frictional engagement of the converging sides of slot 26 with portion 23 of the pinch-roller hub will continue to urge pin 27 against inner cam surface 40a. Therefore, after each movement of pin 27 in the direction of the arrow u on FIG. 7A in response to engagement with a large radius portion of inner cam 40, pin 27 will return in the direction of the arrow t when engaging with the small radius portion of cam 40, and thus will pass through gap 43 between inner cam 40 and drive projection 42, as shown in full lines on FIG. 7A. In other words, so long as pinch roller 1 continues to rotate with the apparatus in its normal forward mode, cam-following pin 27 will continuously engage inner cam surface 40a and will not be engaged by drive projection 42.

However, when tape 8 in a cassette is fully unwound from the supply reel and wound onto the take-up reel, the tape stops running or moving even though the apparatus remains in its normal forward mode and the rotation of capstan 9 by its associated motor is continued. When the tape stops moving or running, pinch roller 1 in contact therewith stops rotating and, in response thereto, device 20 embodying the invention effects a shut-off or mode-change operation during the following revolution of gear 68.

SHUT-OFF OPERATION

Figure 7B:
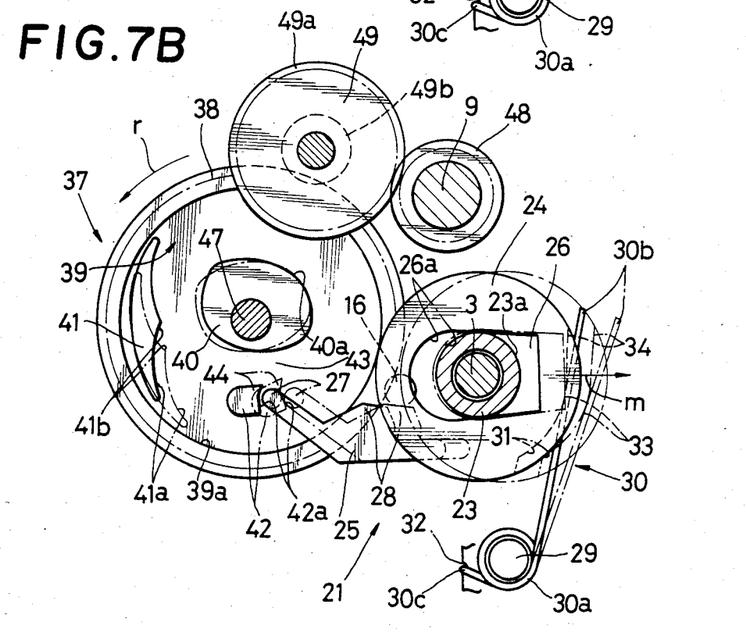
Figure 7C:
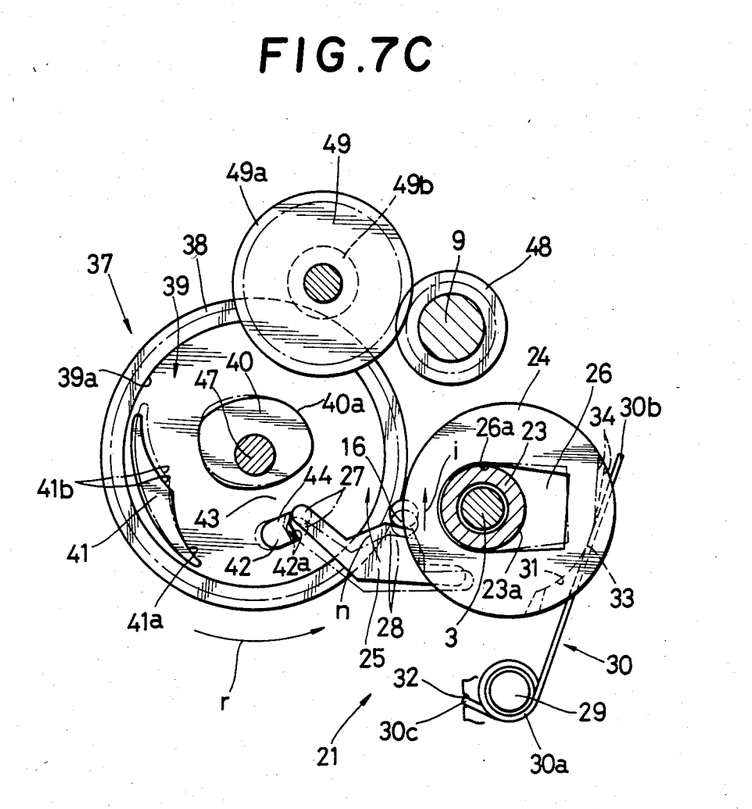

As soon as pinch roller 1 stops rotating, the frictionally applied force for urging shut-off lever 21 to turn in the direction of the arrow n about the axis of the pinch roller is removed from shut-off lever 21. Therefore, when, in response to the continued turning of gear 38, the large radius portion of inner cam member 40 moves pin 27 in the direction of the arrow u on FIG. 7A to the position shown in dot-dash lines, pin 27 remains in such position so as to be engageable by the operative surface 42a of drive projection 42, as shown on FIG. 7B. In response to the continued rotation or turning of gear 38 in the direction of the arrow r with drive projection 42 in engagement with pin 27, shut-off lever 21 is longitudinally displaced in the direction of the arrow m (FIG. 7B) against the force of spring arm 30b. The engagement of semi-circular end wall surface 26a of slot 26 with the surface 23a of hub portion 23 limits such longitudinal movement of lever 21 in the direction m to a position in which step 28 on arm portion 25 of lever 21 confronts the abutment or pin 16 directed upwardly from latch plate 11. With further longitudinal movement of shut-off lever 21 in the direction of the arrow m in FIG. 7B prevented by the engagement of end wall surface 26a with peripheral surface 23a, additional turning of gear 38 in the direction of the arrow r effects angular displacement of shut-off lever 21 about the axis of the pinch roller axle 3, for example, from the position shown in dot-dash lines to the position shown in full lines on FIG. 7C. During such angular displacement of lever 21, step 28 displaces pin 16 in the direction of the arrow i and thereby causes upward pivoting of latch plate 11 for releasing nose 14 from keeper 15 and thereby permitting return of push-button 7 to its inactive position for establishing the stop mode of the apparatus, as previously described with reference to FIG. 3. It will be appreciated that, during the angular displacement of shut-off lever 21 by drive projection 42, as described above with reference to FIG. 7C, the inclined end portion 44 of operative surface 42a on drive projection 42 ensures that pin 27 will not slip or become inadvertently disengaged from surface 42a.

Figure 7D:
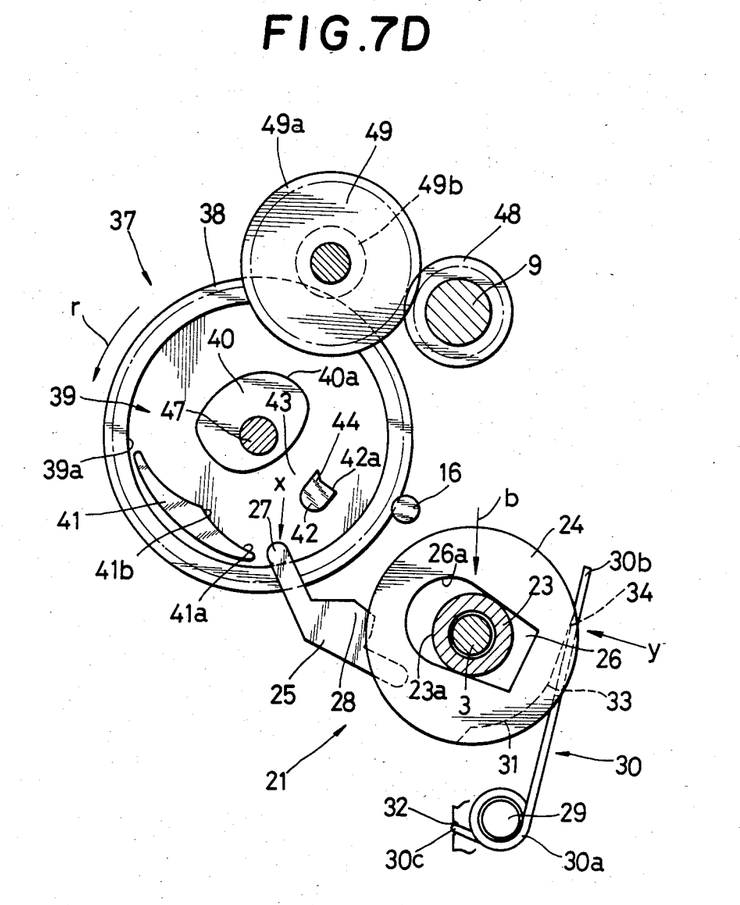

Of course, upon the establishment of the stop mode of the apparatus, pinch roller 1 is moved to its inoperative position shown in dot-dash lines on FIG. 2 with the result that shut-off lever 21 is similarly moved in the direction of the arrow b to its inoperative position shown on FIG. 7D. In response to such movement of lever 21 to its inoperative position, pin 27 is disengaged from operative surface 42a of projection 42 and is urged in the direction of the arrow x against the peripheral surface 39a of recess 39. Such pressure of pin 27 against peripheral surface 39a results from the fact that, in the inoperative position of shut-off lever 21, spring arm 30b acts upon disk-shaped portion 24 of lever 21 at the end of the straight portion 34 of groove 31 to apply a spring force to lever 21 in the direction of the arrow y which is offset in respect to the axis of the pinch roller. Thus, the spring force acting in the direction of the arrow y tends to turn lever 21 in the counterclockwise direction about hub portion 23, as viewed on FIG. 7D.

ATTEMPT TO REESTABLISH NORMAL FORWARD MODE AFTER SHUT-OFF OPERATION

Figure 7E:
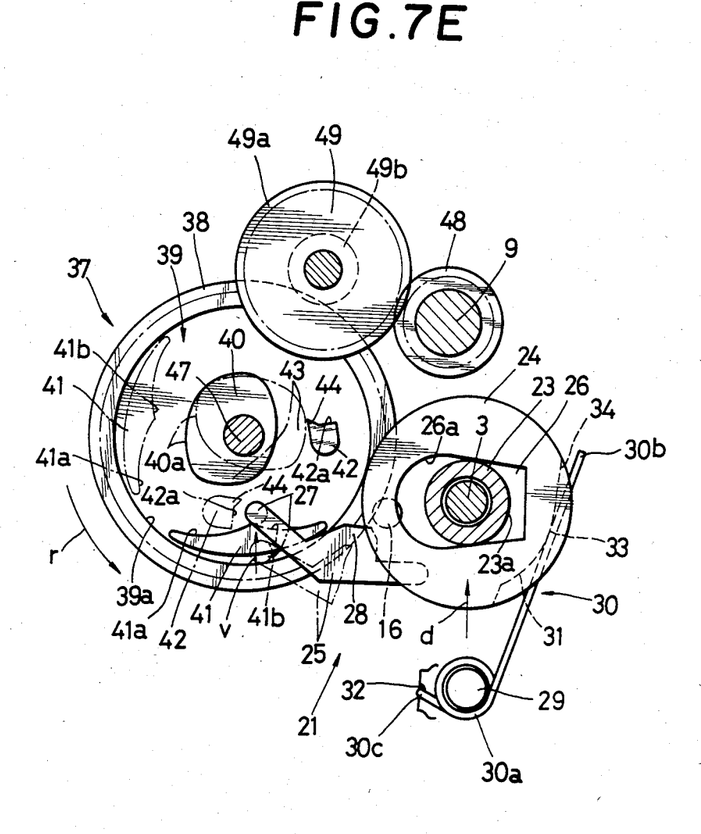

In the event that push-button 7 is manually depressed to its active position after a shut-off operation by device 20, pinch roller 1 is moved to its operative position but cannot be rotated because tape 8 is already fully unwound from the supply reel onto the take-up reel and, hence, cannot be moved or advanced by the rotated capstan 9. On the other hand, the rotated capstan 9 does cause turning of gear 38 in the direction of the arrow r and, as a result thereof, cam-following pin 27 of lever 21 is engaged by outer cam surface 41a and moved thereby in the direction of the arrow v (FIG. 7E) so as to to be moved into the path of drive projection 42. Since pinch roller 1 and lever 21 are in their operative positions, spring arm 30b acts against the arcuate portion 33 of groove 31 so as to apply the spring force in a direction passing through the axis of the pinch roller about which lever 21 is angularly displaceable. Accordingly, in the condition illustrated on FIG. 7E, neither the force of spring 30 nor the rotation of the pinch roller urges mode-change lever 21 angularly about the pinch roller axis with the result that cam-following pin 27 remains in the position shown in full lines, that is, in the path of projection 42, as gear 38 continues to turn in the direction of the arrow r. Eventually, drive projection 42 comes into contact with pin 27 which remains in its path and the shut-off operation described above with reference to FIGS. 7C and 7D is repeated.

FAST-FORWARD OR REWIND MODE OF THE APPARATUS

Figure 8A:
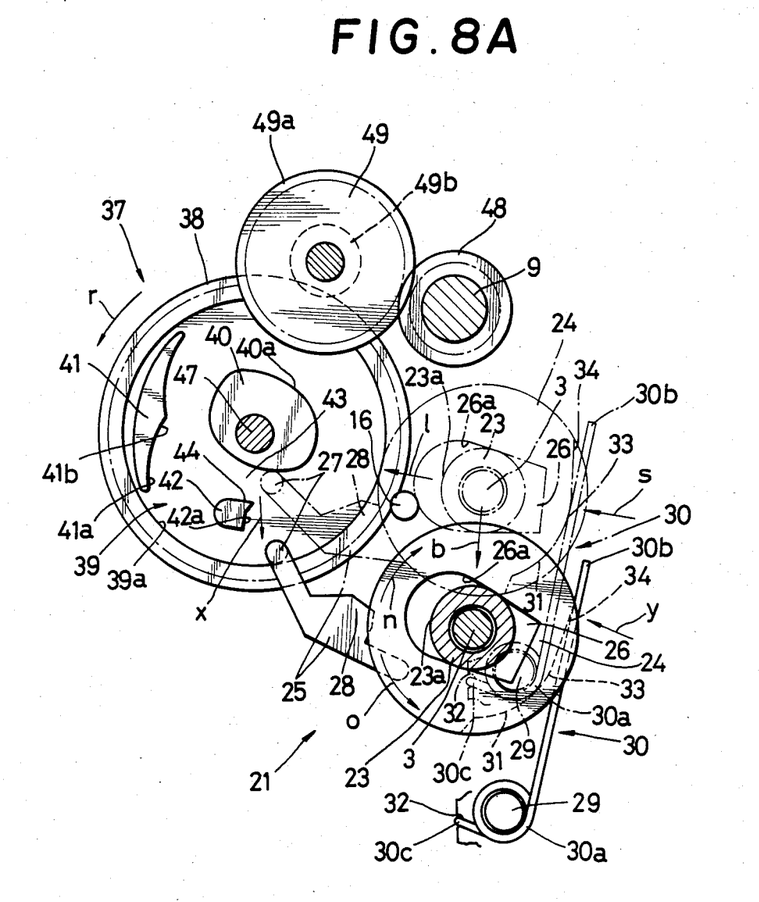
FIGS. 8A and 8B are plan views similar to those of FIGS. 7A-7E, but illustrating the nature of the operation of the illustrated shut-off device embodying the invention during a rewind or fast-forward mode of operation of the apparatus.

It is to be noted that shut-off device 20 according to this invention ensures that cam-following pin 27 of lever 21 will not be engaged by drive projection 42 in either a fast-forward or rewind mode of the apparatus. More particularly, and with reference to FIG. 8A, it is noted again that, in the normal forward mode of the apparatus, shut-off lever 21 is moved to its operative position indicated in dot-dash lines and at which spring arm 30b acts against the arcuate portion 33 of groove 31 in the direction of the arrow s so as to urge lever 21 only in the direction along the slot 26 indicated by the arrow l. On the other hand, in the fast-forward or rewind mode of the apparatus, as in the stop mode thereof, shut-off lever 21 is moved to, or remains in its inoperative position shown in full lines on FIG. 8A. In such inoperation position of lever 21, the engagement of pin 27 with the peripheral wall surface 39a of recess 39 causes turning of lever 21 in the direction of the arrow n about the axis of the pinch roller defined by axle 3 so that straight end portion 34 of groove 31 is engaged by spring arm 30b. As a result of such engagement, spring arm 30b acts against lever 21 along the line of force indicated by the arrow y which is offset from axle 3 and thus urges lever 21 to turn in the counterclock-wise direction for pressing pin 27 against peripheral wall surface 39a, as indicated by the arrow x.

Figure 8B:
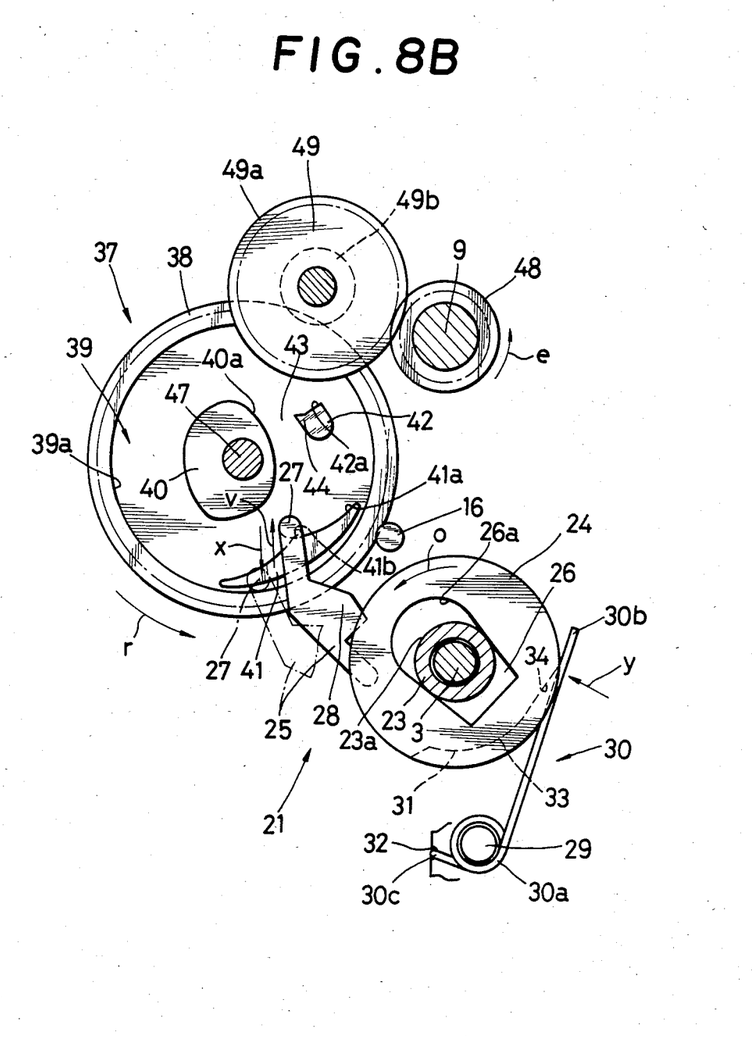

In the fast-forward or rewind mode, gear 38 continues to rotate in the direction of the arrow r in response to the rotation of capstan 9 in the direction of arrow e. During each revolution of gear 38, outer cam surface 41a acts on pin 27 to move the latter in the direction of the arrow v to the position shown in full lines on FIG. 8B upon the engagement of the cusp 41b with pin 27. However, as cusp 41b of outer cam surface 41a moves past pin 27, the latter does not remain in the position shown in full lines on FIG. 8B, that is, in the path of drive projection 42, but rather is urged to return to the position shown in dot-dash lines against peripheral wall surface 39a by the action of spring arm 30b against lever 21 at the position of the arrow y. Accordingly, in either the fast-forward mode or the rewind mode, pin 27 of shut-off lever 21 is never engaged by drive projection 42, with the result that operation of the shut-off device 20 is prevented.

Although the device 20 embodying this invention has been shown and described as effecting automatic change of the apparatus from a normal forward mode to a stop mode, it will be appreciated that the present invention has many other applications. Thus, for example, although the movements of lever 21 shown in FIGS. 7B and 7C have been described as being operable to release the latch by which push-button 7 is retained in its active position, thereby effecting change-over of the apparatus from its normal forward mode to a stop mode, such movement of lever 21 could be similarly employed for changing the direction in which the tape is driven or propelled when the tape is fully unwound from the supply reel and wound onto the take-up reel. Further, in the described embodiment of the invention, the pinch roller 1 has been employed as the rotary member which rotates when the tape is running and which stops when the tape is fully wound on the take-up reel, and to which lever 21 is adapted to be frictionally coupled at the converging sides of slot 26. However, lever 21 may be adapted to be thus frictionally coupled to a rotary member other than the pinch roller.

Having described an illustrative embodiment of this invention with reference to the accompanying drawings, it is to be understood that the invention is not limited to that precise embodiment, and that various changes and modifications may be effected therein by one skilled in the art without departing from the scope or spirit of the invention as defined in the appended claims.

What is claimed is:

1. In a cassette tape recording and/or reproducing apparatus having a motor-driven capstan which, in a selected operating mode of the apparatus, is rotated for driving the tape in the cassette in the direction for winding the tape onto a take-up reel; a device for automatically changing the operating mode of the apparatus when the tape is fully wound on the take-up reel, comprising:
   a pinch roller movable between operative and inoperative positions in respect to said capstan and which is rotated when the tape is running and which stops rotating when the tape is fully wound on said take-up reel, said pinch roller having a cylindrical actuating portion rotatable coaxially therewith;
   a mode-change lever having an elongated hole with converging sides in which said cylindrical actuating portion is received so that said mode-change lever is angularly displaceable about the axis of rotation of said pinch roller and also longitudinally displaceable in the direction along said elongated hole;
   spring means urging said mode-change lever in one direction along said elongated hole for frictionally engaging said converging sides with said actuating portion and thereby frictionally urging said mode-change lever to turn with said pinch roller so long as the latter is rotated;
   means for establishing another operating mode of the apparatus in response to displacement of said mode-change lever in the opposite direction along said elongated hole against the force of said spring means; and
   mode-change drive means effecting a repeated motion in response to rotation of said capstan and being operative to displace said mode-change lever in said opposite direction only when said pinch roller stops rotating and no longer frictionally urges said mode-change lever to turn therewith angularly about said axis, whereby said mode-change lever is moved to an inoperative position in response to movement of said pinch roller to said inoperative position of the latter.

2. A cassette tape recording and/or reproducing apparatus according to claim 1; in which said selected operating mode is a normal forward mode in which said pinch roller is in said operative position for pressing the tape against said motor-driven capstan, and said another operating mode is a stop mode of the apparatus.

3. A cassette tape recording and/or reproducing apparatus according to claim 1; in which said spring means includes a spring arm which, in said operative position of the pinch roller, acts on said mode-change lever along a line of force extending through said axis about which the lever is angularly displaceable so that said spring arm then urges said mode-change lever only in said one direction along the elongated hole and, in said inoperative position of the mode-change lever, said spring arm acts thereon along a line of force offset from said axis for also urging said mode-change lever angularly about said axis.

4. A cassette tape recording and/or reproducing apparatus according to claim 3; in which said mode-change drive means includes a rotatable cam member having inner and outer cam surfaces alternatively engageable with a cam following portion of said mode-change lever extending therebetween, and a drive projection between said cam surfaces engageable with said cam following portion of the mode-change lever for effecting the displacement of the latter in said opposite direction when neither said spring arm nor said pinch roller urges said mode-change lever angularly about said axis.

5. A cassette tape recording and/or reproducing apparatus according to claim 4; in which, in said inoperative position of the mode-change lever, said spring arm urges said mode-change lever angularly about said axis in the direction urging said cam following portion against said outer cam surface, and, when said pinch roller is rotated in said operative position thereof, said actuating portion frictionally urges said mode-change lever angularly about said axis in the direction urging said cam following portion against said inner cam surface.

6. A cassette tape recording and/or reproducing apparatus according to claim 5; in which said inner and outer cam surfaces have respective deflecting cam surface portions angularly displaced from said drive projection and operative, when engaged with said cam following portion, to deflect the latter into the path of said drive projection so that said cam following portion will thereafter remain in said path for engagement by said drive projection when neither said spring arm nor said pinch roller urges said mode-change lever angularly about said axis.

7. A cassette tape recording and/or reproducing apparatus according to claim 6; in which said mode-change lever has an end portion remote from said cam following portion and formed with a groove receiving said spring arm, said groove having an arcuate portion substantially concentric with said axis when said actuating portion frictionally engages the sides of said hole and which is tangentially engaged by said spring arm when said pinch roller is in said operative position thereof, said groove further having a straight end portion engaged, at an angle by said spring arm when said pinch roller is in said inoperative position.

8. A cassette tape recording and/or reproducing apparatus according to claim 7; further comprising push-button means adapted to be manually depressed to an active position for urging said pinch roller against said capstan with the tape therebetween and thereby establishing a normal forward mode as said selected operating mode, said push-button means being resiliently urged to return to an inactive position in which said pinch roller is away from said capstan for establishing a stop mode as said other operating mode of the apparatus, latch means engageable when said push-button means is depressed to said active position for maintaining said normal forward mode, and actuating means on said mode-change lever engageable with said latch means for releasing the latter in response to said displacement of the mode-change lever in said opposite direction along said elongated hole.

9. A cassette tape recording and/or reproducing apparatus according to claim 8; in which said latch means includes a slide movable with said push-button means and having a keeper therein, a latch plate pivoted above said slide and having a latch nose engageable in said keeper in said active position of said push-button means, and an abutment on said latch plate engageable by said actuating means on the mode-change lever for pivoting said latch plate to lift said latch nose from said keeper in response to said displacement of the mode-change lever.

* * * * *